United States Patent [19]

Beatty et al.

[11] Patent Number: 5,920,824
[45] Date of Patent: *Jul. 6, 1999

[54] METHOD FOR COMPUTING CURRENT TIME ON A CELLULAR MOBILE SYSTEM

[75] Inventors: Dana L. Beatty, Boca Raton; Michael A. Pitts, Delray Beach; Robert V. Jenness, Boca Raton, all of Fla.

[73] Assignee: International Business Machines Corporation, Armonk, N.Y.

[ * ] Notice: This patent issued on a continued prosecution application filed under 37 CFR 1.53(d), and is subject to the twenty year patent term provisions of 35 U.S.C. 154(a)(2).

[21] Appl. No.: 08/923,548

[22] Filed: Sep. 2, 1997

Related U.S. Application Data

[63] Continuation of application No. 08/400,655, Mar. 8, 1995.

[51] Int. Cl.⁶ .................................................. H04Q 7/20
[52] U.S. Cl. .......................... 455/550; 455/432; 455/566; 368/21
[58] Field of Search ..................................... 455/418, 419, 455/422, 425, 432, 550, 552, 556, 566; 368/21, 22, 47

[56] References Cited

U.S. PATENT DOCUMENTS

| | | | |
|---|---|---|---|
| 5,020,091 | 5/1991 | Krolopp et al. | 379/58 |
| 5,159,625 | 10/1992 | Zicker | 379/59 |
| 5,309,500 | 5/1994 | Koma et al. | 379/58 |
| 5,375,104 | 12/1994 | Ishii et al. | 368/22 |
| 5,590,092 | 12/1996 | Fehnel | 455/566 |
| 5,655,218 | 8/1997 | Smolinske | 455/566 |

*Primary Examiner*—Dwayne D. Bost
*Assistant Examiner*—Nay A. Maung
*Attorney, Agent, or Firm*—Malin, Haley, DiMaggio & Crosby, P.A.

[57] ABSTRACT

A method is disclosed for computing the local time and date of a mobile computer, when a user has traveled to a time zone different from his or her home time zone is disclosed. A system identification number is received through a cellular transceiver which is associated with an antenna. The system identification number is received by the mobile computer through a cellular modem. A database is provided within the mobile computer listing all of the system identification numbers throughout the North American Cellular Network. The database also provides the geographic location and time zone for each system identification number. Also listed in the database is information whether daylight savings time is observed in the geographic location associated with the system identification number. The computer, upon receiving a system identification number, searches the database for the same identification number. If a match is found, the computer obtains the relevant information and calculates the current local system time from the home system time previously stored in the computer. If no match is found, the user has the option to update the database, to include the new system identification number.

16 Claims, 3 Drawing Sheets

| CITY | STATE | SID | SYSTEM | DAYLIGHT | TIME ZONE |
|---|---|---|---|---|---|
| Atmore | AL. | 01011 | A | Y | C |
| Atmore | AL. | 01012 | B | Y | C |
| Auburn | AL. | 00319 | A | Y | C |
| Auburn | AL. | 01902 | B | Y | C |
| Birmingham | AL. | 00113 | A | Y | C |
| Birmingham | AL. | 00098 | B | Y | C |

METHOD FOR COMPUTING CURRENT TIME ON A CELLULAR MOBILE SYSTEM

This application is a continuation of application Ser. No. 08/400,655, filed Mar. 8, 1995.

BACKGROUND OF THE INVENTION

1. Field of the Invention

The present invention relates generally to mobile computers and, more particularly, to a method for automatically computing the local time and date of a mobile computer, when a user has traveled to a time zone different from his or her home time zone.

2. Description of the Prior Art

With the advent of mobile computers, users are now capable of taking their computer systems with them as they travel. However, as user's travel with their systems through different time zones, the time and date stored within the computer system does not adjust. Thus, as the mobile computer travels through various time zones, the system stays set to the date and time zone of its home base.

Normally, the user ignores the time difference rather than going through the trouble of manually updating the internal clock, especially where only one computer is involved and the user is not traveling for an extended period of time out of his or her home time zone. However, when two separate users, in different time zones, are attempting to synchronize work, the importance of having their respective computer systems represent the correct time becomes apparent.

Thus, what is needed in the art is a method for computing, storing and/or displaying the local time and date on a mobile computer, when a user has traveled with the computer to a time zone different from his or her home time zone. It is therefore, to the effective resolution of the aforementioned problems and shortcomings that the present invention is directed.

The present invention utilizes cellular telephone technology to achieve the objects of the present invention. The public telecommunication systems can be divided generally into two components: the public switched telephone network (wireline) and the cellular network. The cellular or mobile subscriber network consists of numerous mobile telephone subscribers who remain in communication with one another and with telephones connected to the public switched telephone network by virtue of radio links within a plurality of adjacent cells. Each cell is illuminated by the radio transmissions from a particular base station which covers that cell and which is in turn coupled to a mobile switching center ("MSC")which controls the radio linkages between many different base stations and their associated cells covering a given geographic area and provides interconnection to the public switched telephone network (PSTN). Each cellular exchange or cellular system is made up of one or more MSC's and its associated base stations serving the mobiles within a particular geographic area. In the United States all service areas are covered by two (2) competing carriers, called "A" and "B" carriers.

Each base station provides service to its cell through a multiplicity of both control and voice channels. The set of control channels is small relative to the voice channels and the frequencies of the control channels are known in all subscriber units via the system design. The forward control channel is used by the base station to indicate its presence, to alert subscriber units to incoming calls, and to assign voice channels for calls requested by subscriber units over the reverse control channel. Once a call has been set up, control of the call (e.g. for handoff to a different cell) is achieved through control messages imbedded in the voice channel.

When a subscriber unit is first turned on, it scans all of the known forward control channels to find the strongest available signal. If none is found, it continues scanning until the subscriber enters a service area.

The forward channel contains a system identifier field (SID) encoded with the system ID number of the serving carrier. SIDs were assigned for all areas of the United States by the FCC in the design of the cellular phone system, and denote one of a multiplicity of designated metropolitan or rural service areas that roughly correspond to city and/or county boundaries. This system ID code is periodically included in the message stream on all active forward control channels for each cell. The SID is only one of several pieces of data included in the forward channel broadcast, but it is one of key interest to the instant invention.

The relationship between SID and geographic location is known and fixed by the FCC. Since this information is broadcast at all times, it is available free to any receiver capable of tuning in, demodulating, and decoding the control channels signals, however, in practical cases, a cellular phone transceiver would be the preferred receiving device.

SUMMARY OF THE INVENTION

Generally, the present invention discloses a method for computing, storing and displaying the local time and date on a mobile computer, when a user has traveled with the computer to a time zone different from his or her home time zone. Alternatively, the home time can be computed based upon a stored local time.

In use, the user initially sets up his or her home time and time zone. When the user travels, the cell-site information received by the computer is used to compute local time from the previously configured home time and home time zone. In the preferred embodiment, the computer system, which includes the mobile computer, a modem having cellular mode capability, and a cellular radio, runs an installed program which queries the modem and radio to see which SID or cellular system it got the signal from and based on that will search a database stored within the mobile computer for the appropriate cellular SID. The database provided within the personal computer has all of the cellular system identification numbers (SIDs) manually entered or configured at install time. Once the SID is found, the local or current city and time zone are determined which are also provided with each SID record in the database. Once determined the system takes its home time and computes and/or displays the local time. Where the differences in time involve different days, the local date is also computed and/or displayed. The computed time is also adjusted for Daylight Savings Time, where appropriate.

Accordingly, the SID is used as a look up in the database of SIDs. Once the SID is found in the database, the database record for the SID, in conjunction with the previously configured home time and home time zone, is used to compute the local time. The program queries the subscriber unit for the SID. The frequency of this inquiry can be adjusted.

Thus, when the subscriber unit receives a control channel signal, the SID number is encoded therein, allowing the computer system to determine the serving cellular carrier and to determine which city the carrier is transmitting from. The SID gives the user an idea of where he or she is at. The SID itself is merely a number, the geographic location and time zone associated with the SID, is found by matching the SID with a corresponding SID record stored in the database. In addition to the SID number, the SID record can include the specific geographic location (city, state) and time zone (i.e. central, eastern, pacific, mountain, etc.) associated with the SID, as well as whether or not the geographic location supports or participates in the daylight savings time.

Accordingly, the present invention uses the cellular network and particularly the cellular system SID as a means of determining the geographic location of the mobile computer system. The cellular network gives a granular geographic location. However, the cellular phone network is not used as a means for setting the time of day. Instead, the mobile computer receives the SID, from which the geographic location and thus time zone are determined, from the cellular system and from such received information computes the local time of the mobile computer from the stored home time of the mobile computer.

The present invention does not receive the current time-of-day via the cellular phone system. Rather, the present invention determines the current geographic location via the cellular phone system and then uses such information to determine the local time zone. Thereafter, the mobile computer determines if there is a difference in "local" time as compared to the stored "system" time. Additionally, the "local" and/or "system" time can be displayed by the mobile computer by conventional means.

It is therefore an object of the present invention to provide a method for automatically computing the local time and date of a mobile computer, when a user has traveled to a time zone different from his or her home time zone.

It is another object of the present invention to display the current local time and date, in addition to the home time and date, on a mobile personal computer.

It is yet another object of the present invention to update or set the system clock within a fraction of a second from the atomic clock.

It is a further object of the present invention to improve the location awareness of the displayed time on a mobile computer.

In accordance with these and other objects which will become apparent hereinafter, the instant invention will now be described with particular reference to the accompanying drawings.

In accordance with these and other objects which will become apparent hereinafter, the instant invention will now be described with particular reference to the accompanying drawings.

BRIEF DESCRIPTION OF THE DRAWINGS

The invention may be better understood by reference to the drawings in which.

DESCRIPTION OF THE PREFERRED EMBODIMENTS

Figure 1:
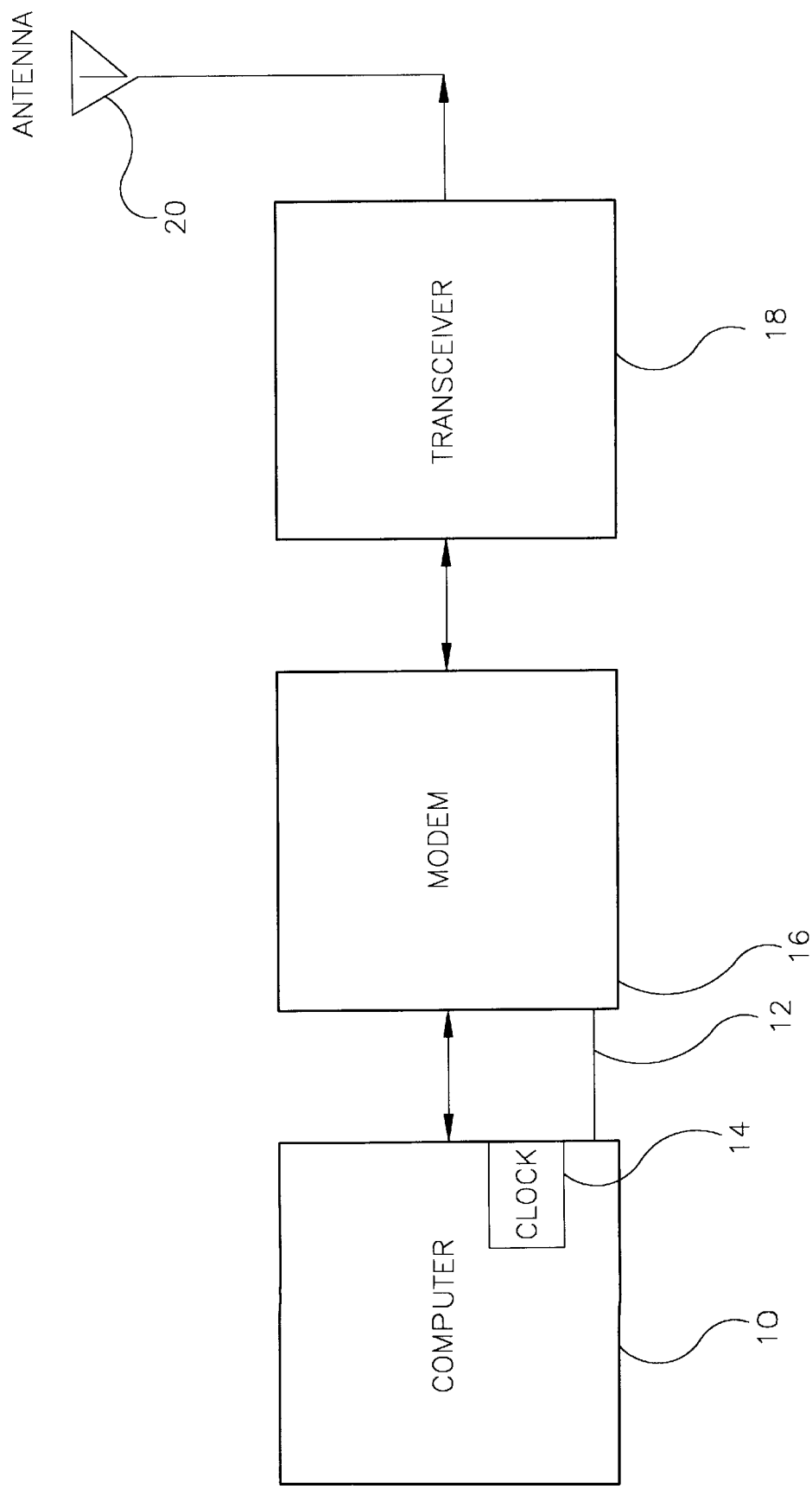
FIG. 1 is a block diagram showing one embodiment of the present invention.
Figure 2:
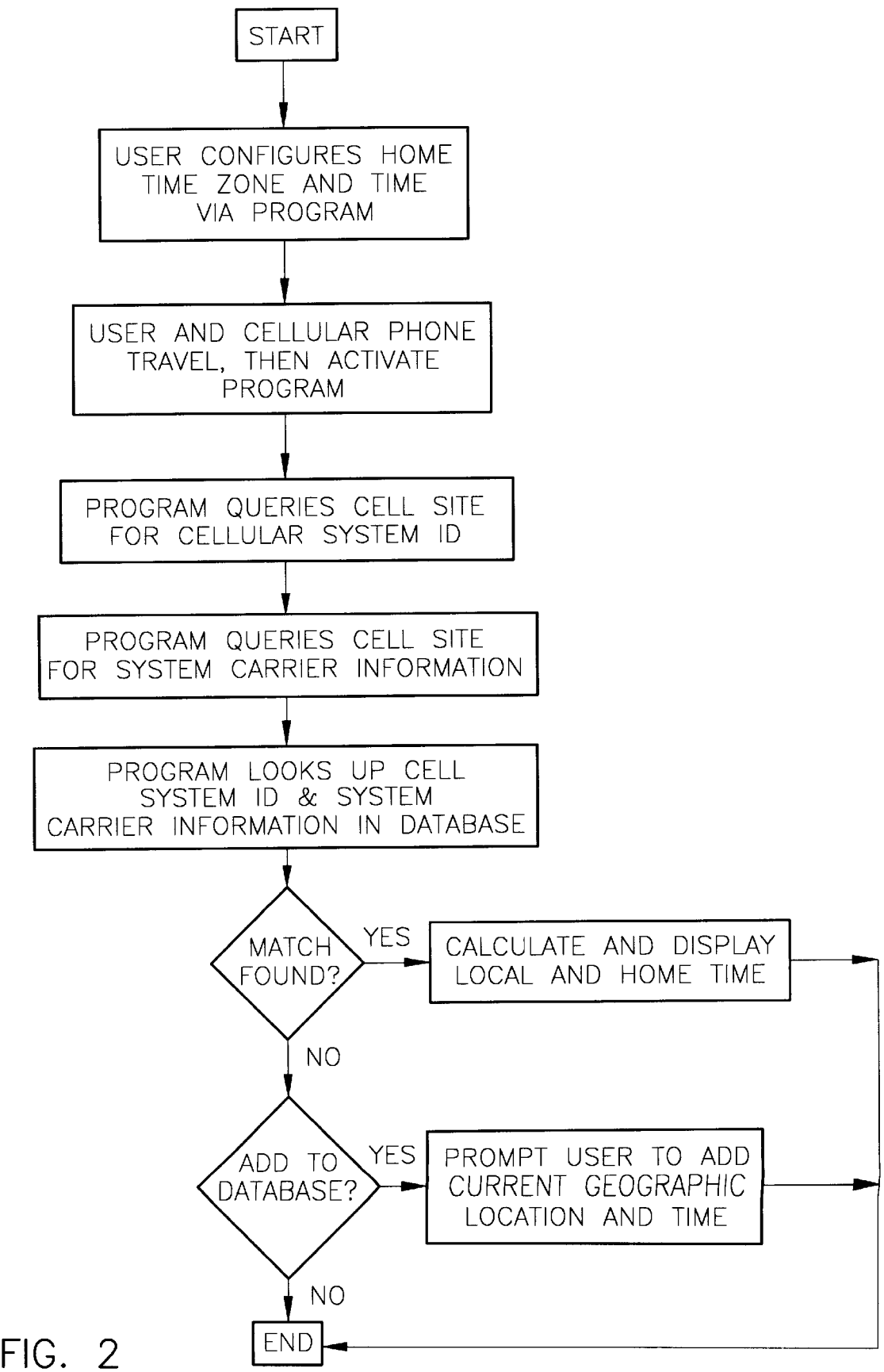
FIG. 2 is a flowchart of routines carried out by the mobile computer in accordance with the present invention.

As can be seen in FIG. 1, the hardware involved in implementing the present invention consists of a standard personal computer (PC) 10, having an internal real-time clock 14 as is standard in such devices, and at least one standard serial or PCMCIA port 12, connected to a cellular capable modem 16 and a cellular transceiver 18. The modem and transceiver will hereinafter be referred to as the cellular subscriber unit. The subscriber unit performs both cellular phone functions and data and control interface to the remainder of the PC, and contains dynamic storage for operational states and parameters and non-volatile storage for the user's cellular network registration parameters. The modem 16 contains all the function normally associated with a PC modem, and in addition has provisions to access the cellular transceiver states and parameters via modem commands following the standard syntax.

Modem 16 may have many modes or states capabilities such as a public switch telephone network mode, voice public switch telephone network mode, cellular mode, cellular voice mode, idle mode, etc. However, it is to be understood that a plain modem hooked up to a cellular phone may also be utilized and is within the scope of the present invention. Preferably, modem 16 must be set to either cellular mode or cellular voice mode to activate the transceiver and receive the required cellular data, including the cellular system SID information. To switch modem 16 into cellular mode, an application program stored within computer 10 sends a particular command, formed in the conventional AT or attention command syntax to modem 16 which causes modem 16 to put itself in a correct cellular state or mode. Similarly, to switch to other modes, the application portion of computer 10 sends a different conventional AT command(s) to modem 16 as required, however, only the cellular mode(s) are necessary in utilizing the instant invention.

Modem 16 is connected, by conventional means such as a cable, to a conventional cellular transceiver or radio 18 which is associated with an antenna 20. In one implementation of the present invention, modem 16 and transceiver 18 may be merged together in a single unit. However, such is not limiting and what is important is that a modem and transceiver or equivalent subscriber unit function be provided. In the preferred embodiment a cellular capable modem and cellular phone are packaged within mobile computer 10 to define a mobile computer system.

A conventional microprocessor, located within computer 10, is coupled to modem 16 and transceiver 18 and any other operative circuits to control the operations thereof. For simplification and convenience, the specific connections and control data supplied from the application program to the respective circuits are not illustrated.

The subscriber unit can be adapted to exhibit various modes (i.e. PSTN—regular wired modem, PHONE—regular wired voice transmission, ACM—regular cellular modem & ACV—cellular voice) in addition to the following three states: a power-off mode, standby mode and an active mode, which are associated with cellular devices. In a power-off mode, no signals are transmitted from or received by the computer system and, for all practical purposes, its presence is not recognized by the cellular telephone system. In an in use or active mode, power has been supplied and the user is transmitting an outgoing telephone call to a remote party or answering an incoming telephone call. In the standby mode, power has also been supplied to the system and the system is prepared to initiate or receive a cellular telephone call.

In the standby mode, control messages are transmitted to the subscriber unit from the base station serving the cell in which the computer system is located, and other control messages are returned from the subscriber unit to that base station. The base station in each cell normally transmits control messages over dedicated control channels; and when the subscriber unit enters the standby mode, it is tuned to the strongest dedicated control channel. Since the carrier frequencies of the control channels differ from cell to cell, the tuning of the computer system to the control channel having the highest signal strength thus establishes the particular cell in which the computer system is presently located.

Control messages are transmitted by a base station over its dedicated control channels periodically. As stated above, the control messages include system identification data (SID) which identifies the service provider for that cell. Furthermore, the control messages also provide information on whether the computer system is in communication with the System A carrier or a System B carrier.

In its standby mode, the transceiver receives control messages transmitted periodically from the base station, and via its internal receiver, decodes and stores the contents of the messages, including the SID and system carrier. In the preferred embodiment, the transceiver stores the codes each time they are transmitted, or less frequently if necessary to reduce receiver power consumption. The control messages transmitted periodically from the base station and received by the transceiver are transmitted on what is referred to as the forward control channel (FOCC). It is common in cellular telephone art to refer to a "forward channel" as the channel which carries transmissions from a base station to a mobile station (computer system) and to refer to a "reverse channel" as the channel which carries transmission from a mobile station to the base station.

Thus, in its standby mode, the microprocessor controls modem 16, via a specific AT command, to scan the control messages transmitted most recently received from a base station and stored in the transceiver. The SID and carrier data is coupled by transceiver 18 to modem 16 whereat the system identification data is separated from the remaining portion of the control message. A separate AT command issued to the microprocessor by the application program causes transceiver 18 to couple a control message which includes the system carrier information to modem 16 whereat the system carrier information is separated from the remaining portion of the control message. Upon receiving this information, the work of transceiver 18 and modem 16 is completed, until the AT commands are again issued by the application program. The application program proceeds to match the received information with data stored within database 30, which will be discussed in more detail below. Transceiver 18 includes transmit and receive circuitry, as is conventional, and can be coupled to a suitable antenna system 20 for transmitting and receiving control messages and encoded voice data as is conventional in cellular mobile telephone systems. voice and data are transmitted to a base station over separate channels which are distinct from the channels over which control and voice date are transmitted to the computer system from the base station.

Transceiver 18 can be adapted conventionally to detect various control messages that may be included in a overhead message train transmitted from a base station. For purposes of the present invention, transceiver 18 is particularly adapted to detect system identification data from the control messages.

Cellular transceiver 18 delivers to modem 16 the cellular system identification number (SID) and system carrier information received through antenna 20. The SID and carrier information crosses the interface by modem 16. An AT command specific to modem 16 is used to allow the application program stored within computer 10 to obtain the cellular system information. Computer 10 has a plurality of serial or comports associated therewith. Modem 16 is attached at serial ports 12 of computer 10 to provide communication between modem 16 and computer 10. An AT command can be issued by the application portion of computer 10 to determine which serial ports modem 16 is attached to.

Figures 3, 4:
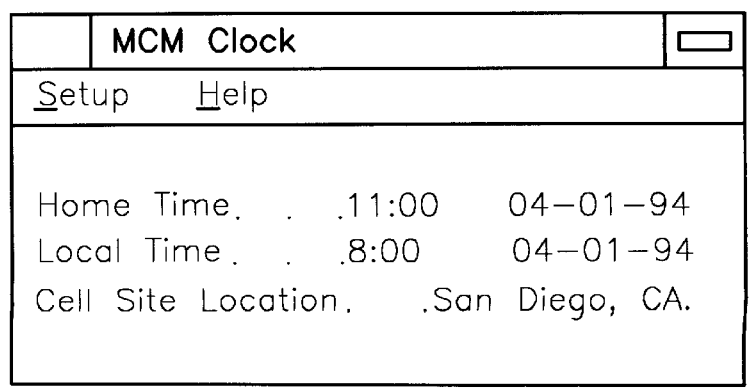
FIG. 3 illustrates a portion of the database stored within the mobile computer in accordance with the present invention.
FIG. 4 illustrates a portion of one embodiment of the mobile computer screen in accordance with the present invention.

A database 30 is disposed or stored within computer 10 by conventional means. Database 30 contains numerous SIDs from all over the North American continent. As seen in FIG. 3, also stored in database 30 is the geographic location, time zone, system carrier and whether the geographic location observes daylights savings time for each SID stored in database 30.

Software is disposed or stored within computer 10 for computing a second time based from a previously inputed first time. In the preferred embodiment the first time is the home time and home time zone of the mobile computer and the computed second time is the local time of the geographic location at which the mobile computer is currently located. Alternatively, the first time could be the local time and local time zone and the computed second time would be the home time of the mobile computer. For purposes of the present invention "local" will refer to the current location (e.g. where the user and computer are physically located at that instant).

After the home time and time zone have been entered by the user, the application portion of computer 10, searches the serial ports looking for a subscriber unit based on a set of AT commands to access the SID from the subscribing unit. If no subscriber unit is present, the software doesn't run and the program is exited. If a subscriber unit is found, the application portion of computer 10 checks to see what mode modem 16 is in, as modem 16 may have modes other than cellular.

If not in cellular, the application portion switches modem 16 to cellular mode, as required to determine the SID, by conventional AT commands such as AT!ACM for amps cellular modem or AT!ACV for cellular voice. Regardless of what cellular system ID the user is on, no cellular phone charge is incurred, when the signal is received through antenna 20. Modem 16 is switched to cellular mode and the AT commands go from the application portion of computer 10 to the subscriber unit to cause the subscriber unit to issue or retrieve information from the cellular network. The SID and other cellular information is broadcast over the air by the cellular network periodically and ultimately received within personal computer 10.

To query a SID and system carrier information for computing the second time, in one embodiment computer 10 issues an AT command to and out through modem 16, in conjunction with transceiver 18. Preferably, all querying is done in stand-by cellular mode, to avoid incurring any phone charges or expenses. Accordingly, the user does not have to be registered to receive the required information. Modem 16, in conjunction with transceiver 18, transmits an electronic message to the cellular network, asking it generally to send back the system information, which includes the cellular SID and system carrier information.

In one cellular modem mode embodiment, the AT command for receiving system information, including the system carrier data is:

AT!AI0.

The system information received would be the following eight digit number:

$X_0X_1X_2X_3X_4X_5X_6X_7$.

Wherein $X_2$ is the system indicator. If $X_2$ has a value of "0" it indicates System Carrier A, while $X_2$ having a value of "1"indicates System Carrier B.

In one cellular modem mode embodiment, the AT command for receiving system information, including the SID is:

AT!AI1.

The system information received would be the following nine digit number:

$X_0X_1X_2X_3X_4X_5X_6X_7X_8$.

Wherein $X_4$–$X_8$ provide the five-digit cellular system ID number. A separate AT command is used for obtaining each the SID and the system carrier information. Once the AT command has been issued and gone out over the cellular network, the network sends back the system information which is a coded piece of data to modem 16, in conjunction with transceiver 18. Modem 16 decodes the system information and obtains the SID from such information based on an AT command received from computer 10.

In an alternative embodiment, when modem 16 is switched into cellular mode, modem 16 automatically goes out and determines or queries what cellular system it is associated with. The nearest base station, relays the cellular system information to modem 16. Modem 16 decodes the system information and obtains the SID and carrier data from such information based on an AT command received from computer 10. Thus, in either embodiment, modem 16 and transceiver 18 acts as a method for obtaining the cellular system identification number for use by computer 10.

Once the SID is determined, the application portion of computer 10 goes to the database to determine the geographic location of the SID. Once the location is determined, modem 16 is switched back to the mode it was in before switching to cellular mode.

Application portion of computer 10 takes the SID and carrier information out from the rest of the information received and compares it with the SIDs and carrier information stored in the database. If no match is found, the received SID and carrier information may be manually added to the database for updating purposes. However, if a match is found, the application portion receives and determines the time zone the SID is in from the information in the associated database record. From that information, the application portion either adds to or subtracts from the home time stored in the computer clock to determine, store and/or display the local time (FIG. 4). Furthermore, the user may update the home time by using the computed local time as a new "home time" for further calculations.

Thus, when searching the database, if a match is found, the time zone is determined and a computation is performed to determine the current local time based on the inputed home time and time zone. If no match is found, the computer determines if the user wants to add the received SID, and relevant information, to the database. Where the user is positioned at or near the borderline of two different time zones, the system does not permanently change the current time, cause it is conceivable that the user could cross over the borderline and be in a different time zone.

In lieu of initially manually setting the home time, the system may make a long distance call to the National Institute of Standards and Technology and update or set the system clock within a fraction of a second from the atomic clock. However, with this method, the user must either be registered with a cellular provider or use a wired telephone and will incur a long distance phone call charge for the call to the National Institute of Standards and Technology.

A possible alternative implementation would be to update the cellular system information sent out by the cellular networks to contain explicit time zone or geographical location and daylight savings time data in the system information, the database may be eliminated. Thus, in this embodiment the computer would query the system information as discussed above. The cellular network would relay such information to modem 16, in conjunction with transceiver 18, for decoding. Computer 10 would take such information and immediately perform the desired computation, thus, bypassing having to match the SID with a SID stored in the database to obtain the relevant time zone information.

Thus summarizing, in use, initially the user settings and defaults are loaded into the mobile computer. The application portion searches the COM or serial ports for the subscribing unit. If the subscribing unit is not found, the program is exited. If the subscribing unit is found, the computer queries and stores the subscribing units current mode of operation. If such current mode is not cellular, the computer issues a command to change the subscribing unit to a cellular mode and waits momentarily for the subscribing unit to stabilize.

Once stabilized, the computer queries the connected cellsite's system ID and also queries the connected cellsite's system side (A or B). Once this information is obtained by the computer, the application portion can issue another command to set the subscribing unit back to its original mode, if its had been changed to receive the required information.

The application portion of computer 10 then looks up the location record from the list of SIDs stored in the database within the computer. If a match is found, the application portion queries the stored system time and (1) displays local time from system time, calculates home time and displays home time—if the user settings have local time as system time; (2) display home time from system time, calculate local time and display local time—if the user settings have home time as system time. If no match is found, the application portion informs the user that the current cellsite is unlisted and gives the user the option to manually add such cellsite to the database. Once manually entered, the above computations can be performed by the application portion of computer. The application portion can also be set to repeat the queries at predetermined intervals.

The instant invention has been shown and described herein in what is considered to be the most practical and preferred embodiment. It is recognized, however, that departures may be made therefrom within the scope of the invention and that obvious modifications will occur to a person skilled in the art.

One such obvious modification would be to combine the application program logic with the control program running in the control processor of an otherwise conventional handheld cellular phone. This would eliminate the modem and related AT commands, but would still obtain the same result.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A method for computing a local system time for a mobile computer, when a user has traveled to a time zone different from his or her home time zone, said mobile computer having a home system time and home time zone entered in said mobile computer, said mobile computer also having a database stored within, said database containing a list of system identification numbers, said database also providing time zone information for each system identification number listed, said method comprising the steps of:

(a) querying and storing the current mode of operation of a subscriber unit;

(b) changing the mode of said subscriber unit to cellular mode, if the current mode of operation is other than cellular;

(c) receiving a connected cellsite's system information, including a system identification number;

(d) deciphering the system identification number from the system information;

(e) searching the list of system identification numbers stored within the database for the connected system identification number to obtain relevant time zone information;

(f) querying the mobile computer to obtain the system time; and (g) selecting a matching system identification number from the database and calculating the local system time based on the entered home system time and the information received from the matching system identification number if a match for the connected system identification number is stored within the database; and if a matching system identification number for the connected system identification number is not stored in the database, entering the connected system identification number and its relevant time zone information to the list of system identification numbers and calculating the local system time based on the entered home system time and the time zone information of the connected system identification number.

2. The method of claim 1 further including the step of updating the home system time by setting the calculated local system time as a new home system time.

3. The method of claim 2 further including the step of displaying the calculated local system time.

4. The method of claim 3 further including the steps of obtaining SID geographic location information from said database and displaying the SID geographic location on said screen.

5. The method of claim 2 wherein the step of calculating the local system time comprises either subtracting or adding to the home system time based on the information received from the database to determine the local time.

6. A method of computing a local time for a mobile computer when the mobile computer is moved from its home area, the mobile computer having a home time and a home time zone stored within, the mobile computer being cellular capable, wherein data signals are communicated between the mobile computer and a base station, said mobile computer having stored therein a database containing a plurality of system identification data, each system identification associated with either a system carrier A or a system carrier B, each system identification data in said database including time zone information, said mobile computer being operable in an idle mode, wherein the mobile computer receives control messages including system identification data and system carrier information from the base station, the method comprising the steps of:

(a) transmitting to said mobile computer, from the base station serving the service cell in which said mobile computer is located, the base station's system information, including a system identification code and a system carrier information;

(b) deciphering the system identification code and the system carrier information from the system information received from the base station;

(c) determining if a matching system identification code and associated system carrier information are stored within the database; and (d) selecting the matching system identification code and computing the local time of the mobile computer based on the stored home time and stored home time zone and from the information stored in the database associated with the matching system identification code and system carrier information; and if the deciphered system identification code is not previously listed in said database, entering the deciphered system identification code and associated system carrier information to the database and computing the local time of the mobile computer based on the stored home time and stored home time zone and from the deciphered system identification code and associated system carrier information.

7. The method of claim 6 further including the step of storing the computed local time within the mobile computer.

8. The method of claim 6 further including the step of displaying the computed local time on a screen associated with the mobile computer.

9. The method of claim 7 further including the step of displaying the computed local time on a screen associated with the mobile computer.

10. An apparatus for use in a cellular capable mobile computer wherein data signals are communicated between the mobile computer and a base station, said mobile computer having stored therein a database containing a plurality of system identification data, each system identification associated with either a system carrier A or a system carrier B, each system identification data in said database including time zone information, said mobile computer being operable in an idle mode, wherein the mobile computer receives control messages including system identification data and system carrier information from the base station, said apparatus comprising: means for receiving control messages from the base station; means for deciphering the system identification data and the system carrier information from the received control message; system identification data and system carrier detecting means associated with said mobile computer for detecting if the system identification data and system carrier information deciphered from the control messages matches a system identification data and associated carrier information stored within the database; means for selecting a matched system identification data from the database; computing means for determining a second time based on a first time and time zone initially stored within the mobile computer, said computing means utilizing the time zone information stored within the database that is associated with the matched system identification data and system carrier information for computing the second time; and means for updating the database to include the deciphered system identification code and associated system carrier information if the deciphered system identification code is not previously listed in said database.

11. A method for computing a second time for a mobile computer, when a user has traveled, with the mobile computer, from his or her based area, said mobile computer having a first time and first time zone stored within said mobile computer, said method comprising the steps of:

(a) obtaining system information from a cellular base station in the vicinity of the mobile computer, said system information including a System Identification Number (SID);
(b) obtaining said SID from the system information;
(c) looking up said SID in a database stored within said mobile computer for deriving SID time zone information; and
(d) selecting a matching SID from the database and computing the second time from the first time and first time zone stored within the mobile computer and the SID time zone information derived from the database; and if a matching SID is not found in the database, entering the SID including a time zone information obtained from the cellular base station to the database and computing the second time from the first time and first time zone stored within the mobile computer and the SID time zone information.

12. The method of claim 11 further including the step of storing the computed second time within the mobile computer.

13. The method of claim 11 further including the step of displaying the computed second time on a screen associated with the mobile computer.

14. The method of claim 12 further including the step of displaying the computed second time on a screen associated with the mobile computer.

15. The method of claim 13 further including the steps of obtaining SID geographic location information from said database and displaying the SID geographic location on said screen.

16. The method of claim 11 further including the step of updating the first time by setting the computed second time as a new first time.

* * * * *